July 21, 1953     R. C. MELANDER     2,645,872
CORD REINFORCED BASE FOR FLORAL DESIGNS
AND METHOD OF MAKING SAME
Filed May 11, 1949
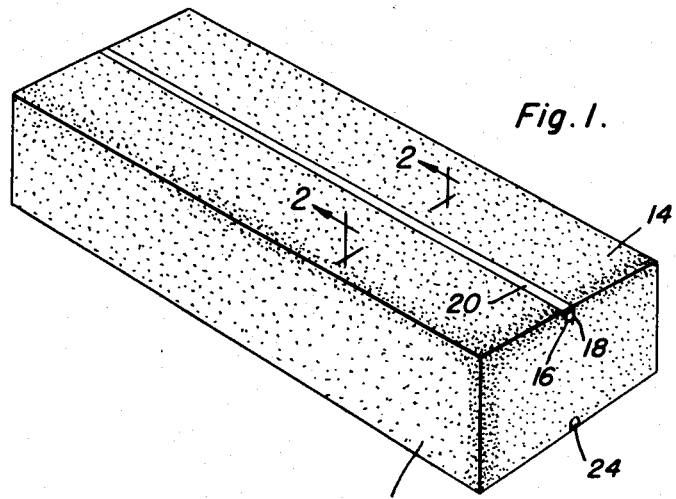
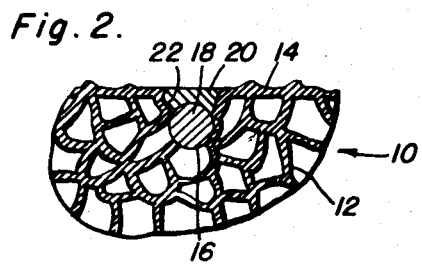
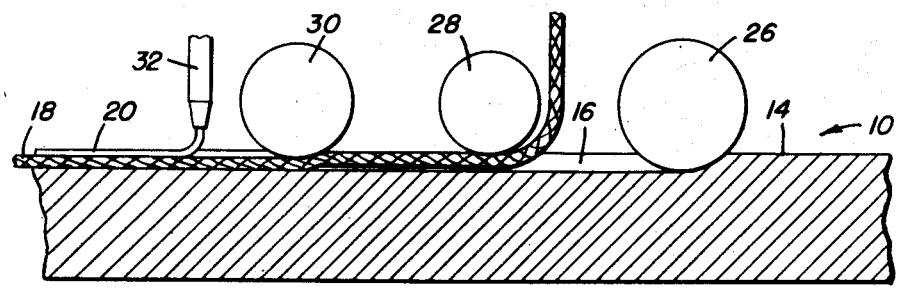
*Inventor*
Raymond C. Melander
By *Clarence A. O'Brien and Harvey B. Jackson*
*Attorneys*

Patented July 21, 1953

2,645,872

UNITED STATES PATENT OFFICE 2,645,872

CORD REINFORCED BASE FOR FLORAL DESIGNS AND METHOD OF MAKING SAME

Raymond C. Melander, Ballston Spa, N. Y.

Application May 11, 1949, Serial No. 92,617

6 Claims. (Cl. 41—12)

1

This invention relates generally to a base adapted to be used for supporting flowers as used by morticians and others in constructing large floral designs.

A primary object of this invention is to provide a base for floral designs which will allow the stems of flowers to be inserted directly thereinto, thus gaining proper support for these stems, all without the employment of the relatively heavy and cumbersome materials now ordinarily employed for floral bases.

Another fundamental consideration and object of this invention is to provide a base for floral designs which is of cellular material with reinforcing means to increase the strength of the base.

Still another object of this invention is to provide a method and means of applying reinforcing members to blocks of cellular material, so that these blocks are strengthened without any great increase in the weight of the blocks.

Yet another object of this invention is to provide a method as mentioned in a preceding claim such as will allow morticians and others to apply the reinforcing elements to blocks of various configurations as the need may arise.

A last object to be mentioned specifically is to provide a base of the type mentioned which will be relatively inexpensive and completely practicable to manufacture, the raw materials being easily available, light in weight and easily transportable, and the actual application of the reinforcing members to the blocks of material being ordinarily carried out by the mortician himself according to the dictates of the particular configurations of the bases to be used.

With these objects definitely in view, this invention resides in certain novel features of construction, combination and arrangements of elements and portions as will be hereinafter described in detail in the specification, particularly pointed out in the appended claims, and illustrated in the accompanying drawings, which form a material part of this application, and in which:

Figure 1 is a three-dimensional view of a block of cellular material with reinforcing cord elements applied thereto;

Figure 2 is a slightly diagrammatic, greatly enlarged cross-sectional view, taken on the line 2—2 in Figure 1; and Figure 3 is a comletely diagrammatic view designed to indicate the steps of the process in constructing the cord reinforced base for floral designs.

2

Similar characters of reference designate similar or identical elements and portions throughout the specification and throughout the different views in the drawing.

Referring now to the drawing in detail, it should first be noted that Figures 1 and 2 relate particularly to the structure of the finished base and reference will first be made to these figures.

The base will consist of a block 10 of cellular material of a light weight, water repellent material such as aerated polystyrene foam, and the cellular structure of this material is indicated somewhat diagrammatically and greatly enlarged in Figure 2, wherein the cell walls are indicated at 12. The cell walls comprising the irregular top face 14 of the block 10 will not be greatly different from the remaining portions of the block, and a channel 16 is formed in the block to extend in the direction in which it is desired to extend the reinforcing cord elements 18, which elements are intrenched in the channels and preferably tightly engaged in these channels. The cord elements 18 may comprise a plurality of interwoven strands of flexible cordage, and this cordage should have sufficient tensile strength to prevent elongation of the side of the block reinforced by the cordage. Mucilaginous material 20 is placed in the channel 16 on the outer side of the cordage 18, and it should be particularly carefully noted that this mucilaginous material 20 will flow into the various cells, between the walls 12 of the cellular material, as somewhat diagrammatically indicated at 22 in Figure 2. The feature pointed out in the immediately preceding sentence is important, since the cellular structure of the material is functionally cooperative with the cordage 18 and the mucilaginous substance 20 in a manner unique in this invention, to result in a structure which is fully reinforced against bending in the direction in which the cordage 18 extends, it being understood that such bending is conceived of as being in a direction tending to stretch the cordage 18. Bending in the opposite direction can be prevented by simply duplicating the cordage 18, as indicated at 24 in Figure 1, on the opposite side of the block 10. Obviously, the number of cordage elements added to the block 10 will be a matter of individual preferment and mechanical expediency and will be dictated largely by the use to which the block 10 is to be put. A suitable mucilaginous material may be formed from a mixture of polymethylacrylate 20%, toluene 56% and methylated spirits 24%.

The method of applying the cordage 18 to the block 10 is diagrammatically illustrated in Figure 3. If reference is now had to this figure, it will be noted that the numeral 14 is used to designate, as in the Figures 1 and 2, the upper face portion of the block 10. A channel forming wheel 26 will be used to form a channel 16 and the cordage 18 will be fed into the channel and pressed thereinto, to the plane of the face 14, by a relatively wide guide wheel 28 which rolls on the face 14 and forces the cordage 18 partially into the channel 16. It may be here noted that this guide wheel 28 also serves as a depthing wheel for the cutter wheel 26. Suitable framework, not shown, will be provided to support said wheels. A cordage embedding wheel 30 will also be mounted on said framework behind the guide wheel 28 to force the cordage to the root of the channel 16. Obviously, the cutting wheel will be followed by the guide wheel and the embedding wheel will follow the guide wheel 28, in the order of their operations, although the block 10 may move or the block 10 may remain stationary and the assembly including the wheels 26, 28 and 30, moved over the face of the block. Finally, the cordage 18 will be cemented in place by cementitious material 20 fed into the channel 16 on the outer side of the cordage 18, by some such means as a nozzle 32 connected with a source of supply of mucilaginous substance, not shown. No attempt has been made to show the mechanical details of the machine used to carry out this method of applying the cordage to the block 10, although the method, in general terms, is thought to have been clearly set forth. The details of the construction of the machine to carry out this method can obviously be varied considerably.

Having described the invention, what is claimed as new is:

1. A base for floral designs comprising a block of synthetic hardened plastic material reinforcing cordage on at least one side of the block, means to secure said cord throughout its length to said block, said cordage having sufficient tensile strength to prevent elongation of said side of the block longitudinally of the cord.

2. A base according to claim 1 and wherein said material is aerated and cellular.

3. A base according to claim 2 and wherein said block has a channel in said side, and said cordage is entrenched in said channel.

4. A base according to claim 3 and wherein said means is mucilaginous material bonding said cordage in said channel.

5. A method of constructing a base of cellular material for floral designs comprising the following steps in the order named, forming a channel in a side of the base, inserting cordage into the channel so that the cordage is tightly held therein throughout its length, and placing a cement in the channel in the cellular material on the outer side of the cordage.

6. A method of constructing a base of cellular material for floral designs comprising the steps of forming a channel in a side of the base, rolling cordage into the channel, pressing the cordage tightly against the bottom of the channel, and placing a cement in the channel in the cellular material on the outer side of the cordage.

RAYMOND C. MELANDER.

References Cited in the file of this patent

UNITED STATES PATENTS

| Number | Name | Date |
|---|---|---|
| 79,122 | Hochbrunn | June 23, 1868 |
| 1,471,587 | Bourn | Oct. 23, 1923 |
| 1,697,787 | Short | Jan. 1, 1929 |
| 1,817,436 | Geyer | Aug. 4, 1931 |
| 1,969,067 | Freeman | Aug. 7, 1934 |
| 2,023,204 | Munters | Dec. 3, 1935 |
| 2,286,861 | Light | June 16, 1942 |
| 2,366,377 | Zois | Jan. 2, 1945 |
| 2,409,910 | Stober | Oct. 22, 1946 |
| 2,416,136 | Arlington | Feb. 18, 1947 |
| 2,440,150 | Mitchell | Apr. 20, 1948 |
| 2,516,197 | Fox | July 25, 2950 |
| 2,526,324 | Bloomfield | Oct. 17, 1950 |
| 2,618,901 | Braun | Nov. 25, 1952 |

FOREIGN PATENTS

| Number | Country | Date |
|---|---|---|
| 21,190 | Great Britain | A. D. 1903 |

OTHER REFERENCES

Modern Plastics Encyclopedia, 1946, published by Plastics Catalog Corporation, pp. 243, 244.